United States Patent [19]

Duester et al.

[11] 4,381,599

[45] May 3, 1983

[54] MACHINE FOR ATTACHING HANGERS TO SLACKS

[75] Inventors: Everett L. Duester, Zeeland; Judd F. Garrison, Grand Rapids, both of Mich.

[73] Assignee: John Thomas Batts, Inc., Zeeland, Mich.

[21] Appl. No.: 207,348

[22] Filed: Nov. 17, 1980

[51] Int. Cl.³ .............................................. B23P 19/00
[52] U.S. Cl. ........................................ 29/717; 29/235; 29/809
[58] Field of Search ..................... 29/235, 238, 281.1, 29/283.5, 709, 715, 717, 809, 816, 818; 221/268, 221/270

[56] References Cited

U.S. PATENT DOCUMENTS 3,616,985 11/1971 Koch .................................. 29/809 X
3,760,484 9/1973 Kowalski ........................... 29/809 X
3,859,710 1/1975 Batts et al. ............................ 29/235

FOREIGN PATENT DOCUMENTS 1316672 12/1962 France .................................. 414/748
389858 11/1973 U.S.S.R. .............................. 221/268

Primary Examiner—Ervin M. Combs
Attorney, Agent, or Firm—Price, Heneveld, Huizenga & Cooper

[57] ABSTRACT

A machine is disclosed for securing clamping garment hangers to individual garments and includes a hanger holding magazine with fixed and movable stops to release the hangers one-by-one to an attaching station where the hanger is automatically positioned to receive a garment. The station also includes reciprocable cantilevered arms for closing and locking the hanger on the garment. Also disclosed is a special package for bulk shipment of the hangers, collated into groups suitable for charging the magazine.

2 Claims, 14 Drawing Figures

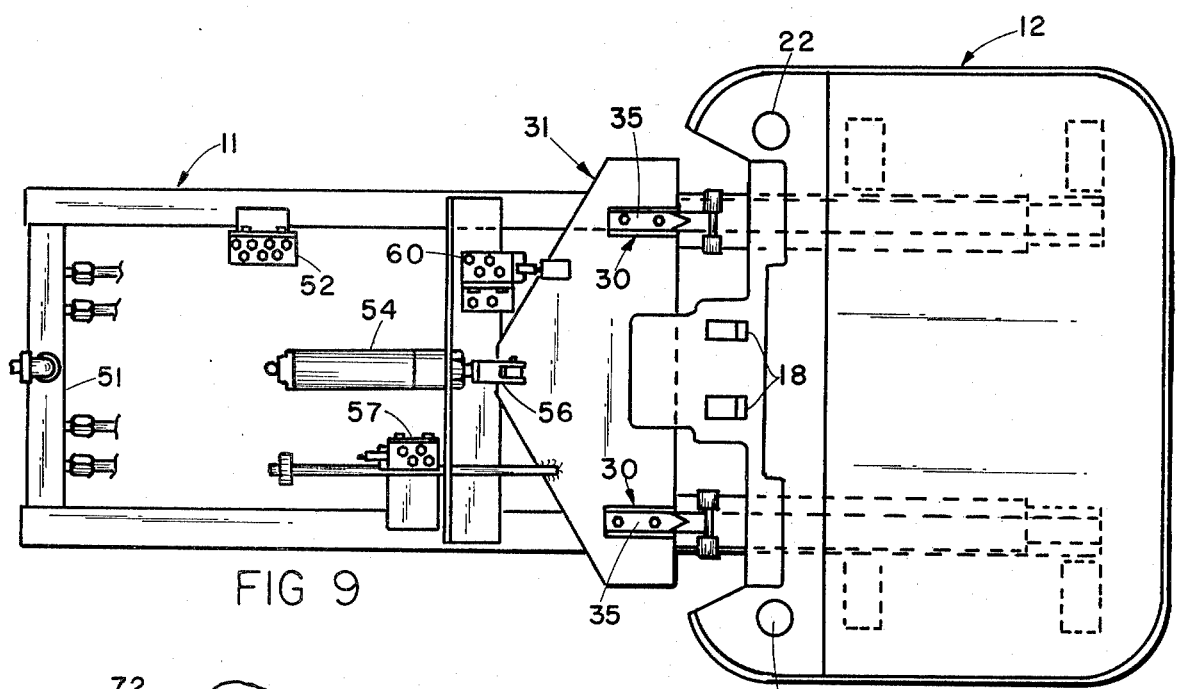
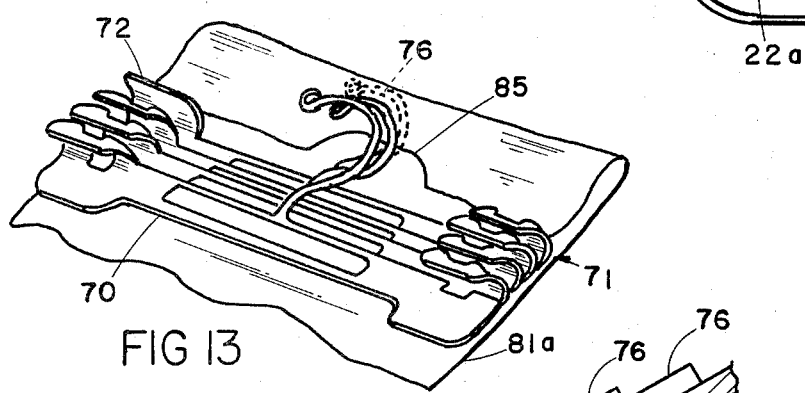
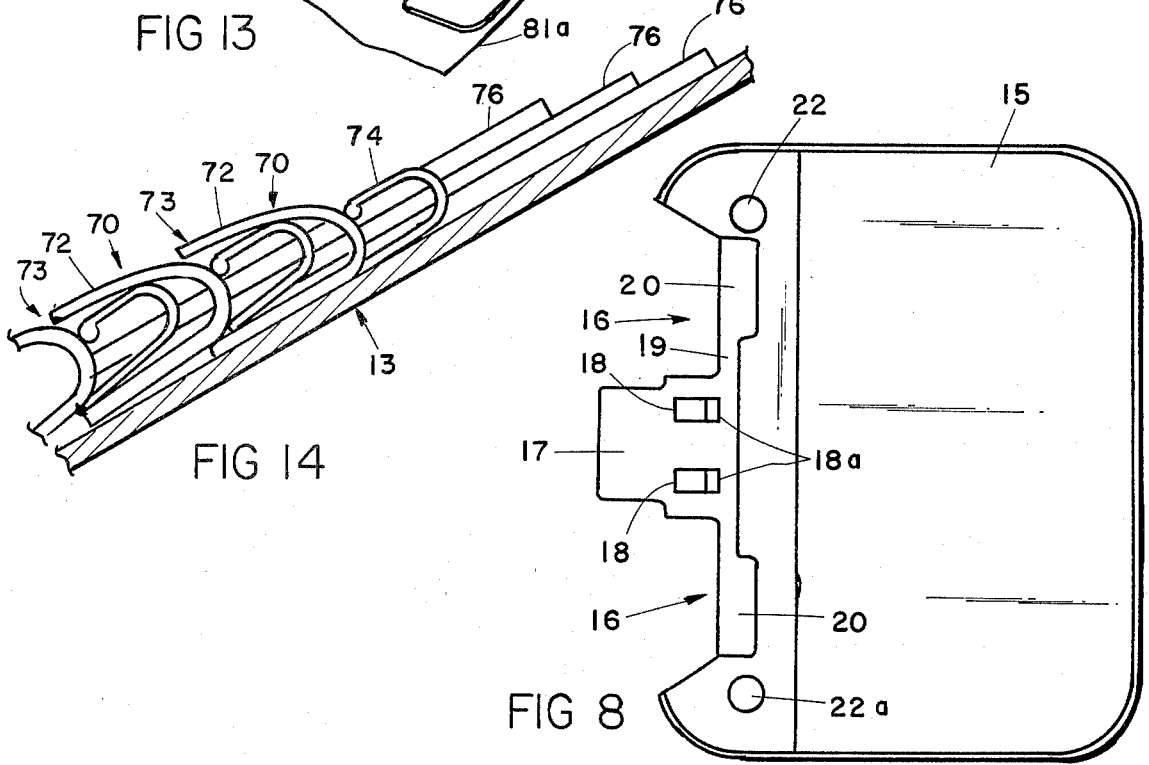

MACHINE FOR ATTACHING HANGERS TO SLACKS

FIELD OF THE INVENTION

This invention relates to machines for securing hangers to garments. Specifically, the invention relates to a machine for securing slack hangers to slacks, skirts and the like. The invention also involves the provision of an automatic hanger supply and feed mechanism and a packaging and shipping means for the hangers which so arranges as to largely eliminate the problems involved in handling and transporting them. The hangers when packaged in accordance with this invention can be withdrawn from their shipping container directly into the magazine for the attaching machine. An earlier concept of the hanger-attaching machine is disclosed in U.S. Pat. No. 3,859,710, issued Jan. 14, 1975 to J. H. Batts et al.

BRIEF DESCRIPTION OF THE INVENTION

The invention is specifically designed for use with garment hangers having an elongated body portion with a hook from which the hanger can be suspended. A garment gripping clamp is provided at each end of the body portion. Each of the clamps has a pair of jaws hinged to one another and a U-shaped locking clip slidable over the jaws for holding them in closed position. One of the jaws is an extension of the body portion while the other jaw is movable. The hanger with which this invention is specifically intended to be used is disclosed in U.S. Pat. No. 3,767,092, issued Oct. 23, 1973 to Judd F. Garrison et al.

The machine has a platform with meas on it for properly seating and positioning each individual hanger as it is delivered to the platform from an associated hopper or magazine. The garments are placed on the platform one at a time and seated between the open jaws of the clamps. The machine is then actuated by the operator. This results in a jaw-closing mechanism moving forward over the clamps pressing the movable jaws into closed position and sliding the locking clip into lock position. As the clamp closing mechanism retracts, the operator withdraws the garment with the attached hanger while the mechanism automatically releases another hanger from the magazine and positions it on the platform ready for the next garment. A further aspect of the invention is the arrangement or stacking of a plurality of the hangers in semi-telescoped condition to form a column. A flexible sheet of material such as paper is placed over the column of hangers and secured to the hangers by means of a pocket at one end of the sheet. The web of paper provides a means of separating the columns of hangers in their shipping container and of withdrawing the hangers one column at a time to feed the attachment machine.

BRIEF DESCRIPTION OF THE DRAWINGS

FIG. 8 is a plan view of the garment receiving and supporting platform;

FIG. 9 is a plan view of the machine taken along the plane IX—IX of FIG. 1;

FIG. 13 is a fragmentary bottom view of a modified pocket for seating the hanger hooks; and FIG. 14 is a fragmentary, enlarged end view of several of the nested hangers.

DESCRIPTION OF THE PREFERRED EMBODIMENT

Figure 1:
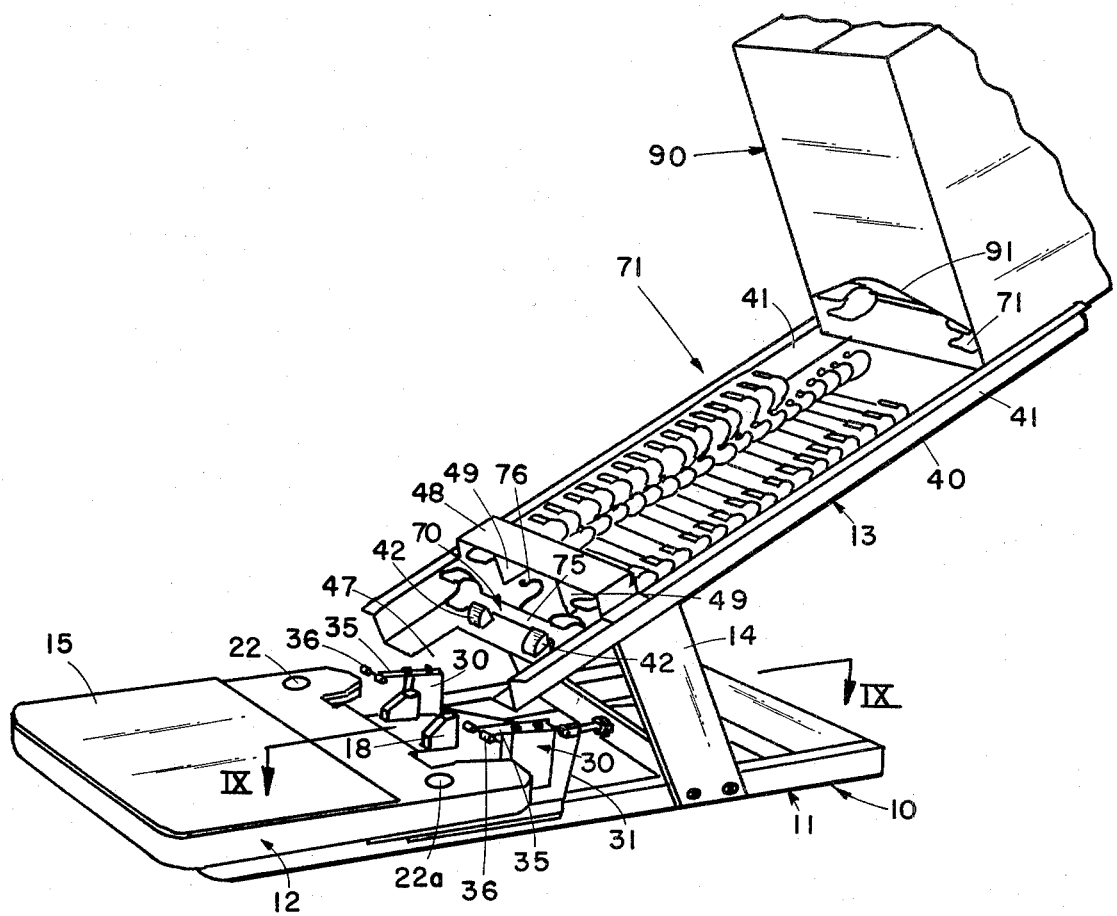
FIG. 1 is a perspective view of the invention showing a hanger in the magazine just prior to delivery to the attachment mechanism.

Referring to FIG. 1, the numeral 10 identifies a hanger attachment machine having a base frame 11 at the front end of which is mounted a platform 12 and suspended over the rearward portion thereof is a magazine tray 13 by means of legs 14. The platform 12 has a forward surface 15 for supporting a portion of a garment. The rearward end of the platform as best seen in FIG. 8 has a pair of recesses 16 between which the center portion 17 projects rearwardly and mounts a pair of hanger guides 18 each of which has a forwardly and downwardly inclined cam surface 18a. The top surface of the platform rearwardly of the surface 15 is formed of a sheet of material over which the fabric of a garment may be readily moved. It is shaped to have a laterally extending recess 19 to receive the body of the hanger and a pair of forward extensions 20 to receive the clamps of the hanger. At the forward end of each of the recess extensions 20 is a vertical wall forming a hanger stop. Laterally outwardly from the recess extensions 20 are unnumbered actuator buttons connected to valves 22a and 22 which will be described more fully hereinafter. The platform 12 is rigidly secured to the frame 11 and is stationary with respect to the remainder of the machine.

Below the lower end of the magazine tray 13, rearwardly of the platform 12 and aligned with the recesses 16, are a pair of closure elements 30. The closure elements 30 are mounted on a suitable yoke 31 which, in turn, is supported for reciprocal movement toward and away from the platform 12. Mounted on the top of each of the closure elements 30 is a forwardly extending arm 35. Each of the arms is a leaf spring with sufficient flexibility that it can flex upwardly to adjust for variations in thickness of the garment to which the hangers are being attached. Rollers 36 are mounted at the forward end of each of the arms.

Figure 5:
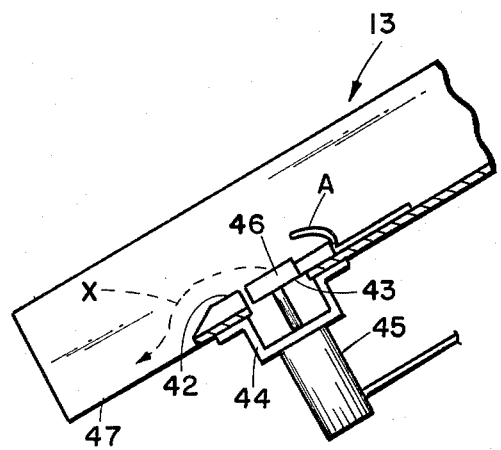
FIG. 5 is a view similar to FIG. 4 illustrating the hanger selecting stop in extended position.
Figure 4:
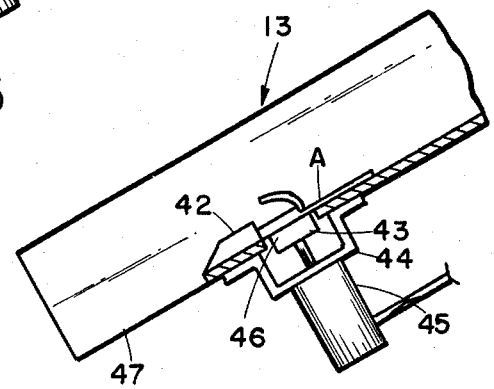
FIG. 4 is a fragmentary, sectional view illustrating the release mechanism of the supply magazine with the hanger selecting and ejecting stop in retracted position.

The magazine tray 13 consists of a shallow trough 40 having sides 41 spaced apart to slidably receive the hangers between them. The magazine tray is sloped downwardly at a sufficient angle to cause the hangers to slide down the tray by gravity. At the lower, forward end of the tray, a pair of fixed stops 42 (FIGS. 1, 4 and 5) are provided which are spaced apart the proper distance to accommodate the hangers with which the machine is to be utilized. Immediately rearwardly of the fixed stops 42, the tray has a laterally positioned slot 43 extending approximately the width of the spacing between the stops 42 (FIGS. 4 and 5). Secured to the lower surface of the tray is a bracket 44 which mounts the actuating cylinder 45 for the reciprocal stop 46. The stop 46 is movable between a retracted position flush with or slightly below the upper surface of the tray to a position flush with or slightly above the top of the stops 42. As will be seen in FIG. 5, when the stop 46 is in its extended or advanced position, a hanger A is restrained against forward movement until, as is shown in FIG. 4 the stop is retracted. At that point the hanger A slides forward by gravity against the stops 42. As will be explained more fully hereinafter, when the stop 46 again advances to its extended position, the hanger A, resting on top of it, is forcibly lifted up and over the stop 42 as indicated by the dotted line and arrow "X" (FIG. 5).

Forwardly of the stops 42, the center portion of the bottom of the tray is cut away the full width of the stops 42 to create a recess 47. Overlying the tray slightly upstream of the reciprocal stop 46 is a guard 48, the purpose of which will be explained subsequently.

The machine is operated by power derived from a suitable source such as compressed air or hydraulic fluid. Assuming compressed air is the power source, the air is admitted through a line 50 to a primary duct 51. From this duct, air is supplied to the four way control valve 52 through the conduit 53 which includes the valves 22 and 22a which are mounted in series so that both have to be open in order to activate the line 53. The air admitted through the line 53 actuates the valve 52 which, when actuated by the opening of the valves 22 and 22a connects the primary air source 51 to the rearward end of the actuating cylinder 54 through the air line 55. The piston 56 of the cylinder 54 mounts the yoke 31 supporting the closure elements 30. Thus, as the piston 56 is extended, the closure elements 30 are shifted forwardly.

When the piston 56 reaches its maximum forward extension, it trips the three way limit switch 57 shifting the four way valve 52 in the opposite direction. The valve 52 then connects the rearward end of the cylinder 54 to exhaust and admits air under pressure to the forward end of the cylinder to retract the piston 56. As the piston 56 reaches its fully retracted position, it trips the three way limit switch 60 to open the line 61 to the primary air source 51. This admits air to the piston 45 extending the plunger or reciprocal stop 46. The plunger 46 remains extended until the piston 56 again initiates its forward movement which causes the limit switch 60 to open the line 61 to exhaust. The reciprocal stop 46 then retracts under the biasing effect of a spring in its actuator 45. In the case of both the cylinder 54 and the actuator 45, the rate at which air is admitted to the cylinders to advance the pistons is controlled by restrictors 62 and 62a, respectively. These are designed to dampen the speed at which the pistons are advanced as the air is admitted.

To take the advantage of the efficiency capabilities of the machine, it is coupled with a means of packaging the hangers for ease of handling and speed of loading the magazine. For this purpose, the individual hangers 70 are organized or stacked in groups which, in effect, constitute a column 71 of hangers. The length of the column 71 is determined by that which is most convenient to handle, such, for example, as 20 or 30 hangers. The movable jaws 72 of the clamps 73 of the hangers, as manufactured, are biased into an open position and the U-shaped locking clip 74 extends outwardly away from the clamp as shown in FIG. 14. At the center of each of the bars 75 forming the body of the hanger is a supporting hook 76 (FIG. 1) which may be either metal or integrally molded plastic, depending on the particular hanger used.

As will be best seen in FIGS. 1, 11, 12 and 14, hangers of this type are particularly adapted to being arranged in a column with the body of the hanger in front seated immediately against the front wall of the hanger behind and the extended locking clip 74 of the hanger in front together with a portion of the jaws of the clamp of the hanger in front nested or recessed within the open jaws of the clamp 73 of the hanger behind. The hook 76 of the hanger in front is laid over and seated upon the hook of the hanger behind (FIG. 14). In this manner, a large number of hangers may be conveniently and compactly arranged to form a stack or column of any particular length suitable for easy handling.

One way of packaging the hangers is to form a stack or column 71 of hangers. Because of the nesting and overlapping of the hangers, the column can be picked up and handled as a unit by grasping it at both ends. In this manner, each column or stack as formed is picked up and the entire column can be placed in the carton 90 in which the hangers are to be shipped. Each stack or column as to laid in the carton forms a layer. After the column has been placed in the carton, a film or web of paper 81 is laid over the hangers. The web of paper at one end has a pocket 82 formed in it by folding over the end of the paper and locking down by suitable means such as glue or staples. Preferably, the pocket 82 is V-shaped to provide a centered seat for the hooks. The column 71 of stacked hangers is slightly lifted at the hook end and the hooks inserted in the pocket of the web. The remainder of the web is laid flat across the top of the hangers. The next column or layer of hangers is placed on top of the web 81 of the first layer in the same manner and another sheet of web is placed over it and, once again, the hook ends are inserted in the pocket of that web. This procedure is repeated until the entire carton is filled. To facilitate the efficient and rapid removal of the hangers from the shipping carton 90 at the bottom of the carton, on the end opposite from the hooks, the carton is provided with a tear out panel which, when removed, provides an opening 91 through which the user can remove the hangers. To withdraw the hangers, the operator grasps the end of the web 81 of the bottom layer or column and by pulling it extracts the entire column. To service this invention, after the access panel has been removed, the carton is mounted in the upper end of the tray. Thus, the layer of hangers withdrawn from the carton is pulled into the tray and slides down into discharge position ready to be mounted on the garments. Once the column of hangers has been so removed from the carton, the paper web 81 is detached and discarded. As each layer or column is removed, those above it in the carbon shift down so that the layers are removed, one by one.

It will be recognized that this invention also provides a protective method of shipping the hangers. The layers being separated by a web will not scratch or injure each other and the web permits each column to be withdrawn without the hangers of one column becoming entangled with the hangers of another column.

Assuming the tray or magazine 13 has been supplied with a stack or column 71 of hangers, the forward one of which is seated against the stops 42 as shown in FIG. 1, the operator presses both valve buttons 22 and 22a to actuate the cylinder 54 which then moves forward as if a garment and a hanger were present. As it retracts, the reciprocal stop 46 is extended pushing the forward hanger up over the stops 42 allowing it to slide down the remaining forward end of the chute and drop onto the guides 18. The downwardly sloping forward surfaces 18a of these stops bias the hanger forwardly to drop off the ends of the stops to seat in the appropriate recesses 19 and 20. As the hanger travels through this path, the cut out 47 permits the hook of the hanger to drop free so that the hanger will not be pivoted or rotated as it discharges from the end of the tray.

The reciprocal stop 46 has a surface of such size and shape that is actually lifts the hanger over the top of the stops 42. It does this with sufficient force to pull it out of its nested relationship with the hanger behind. The combination of the recesses 19, 20 and the guides 18 assure an accurate seating of the hanger on the platform 12.

Figure 2:
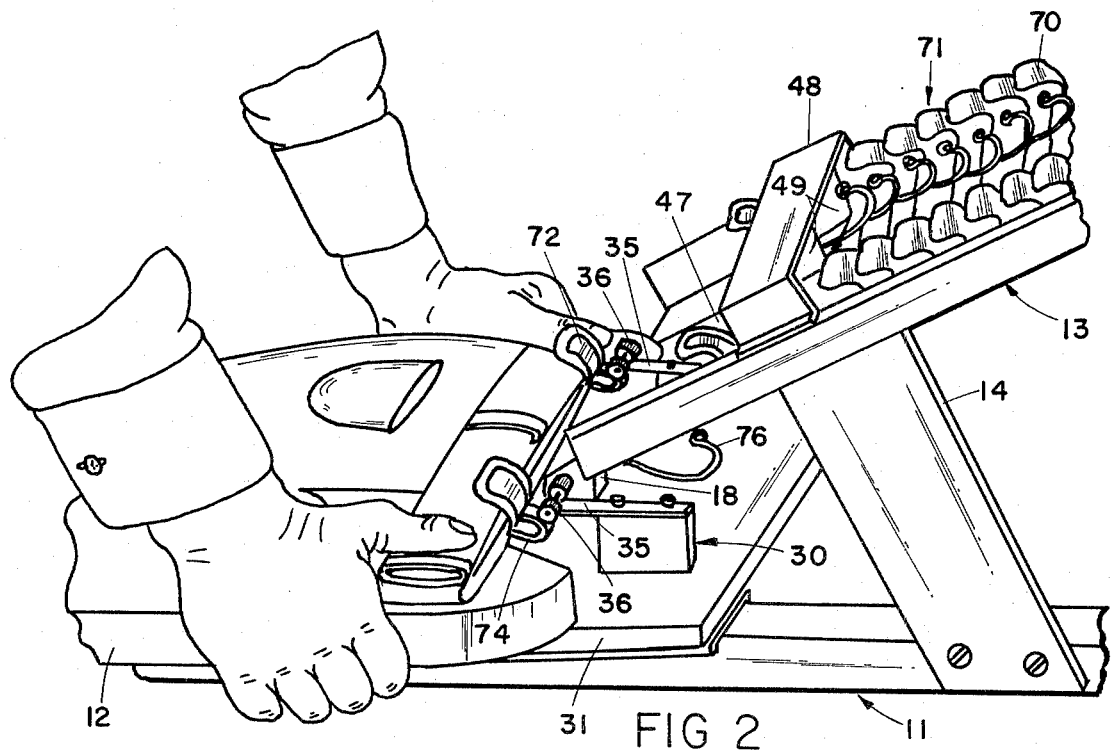
FIG. 2 is a fragmentary perspective view of the invention with a garment seated in the open clamps of a hanger ready to be secured to a hanger.
Figure 3:
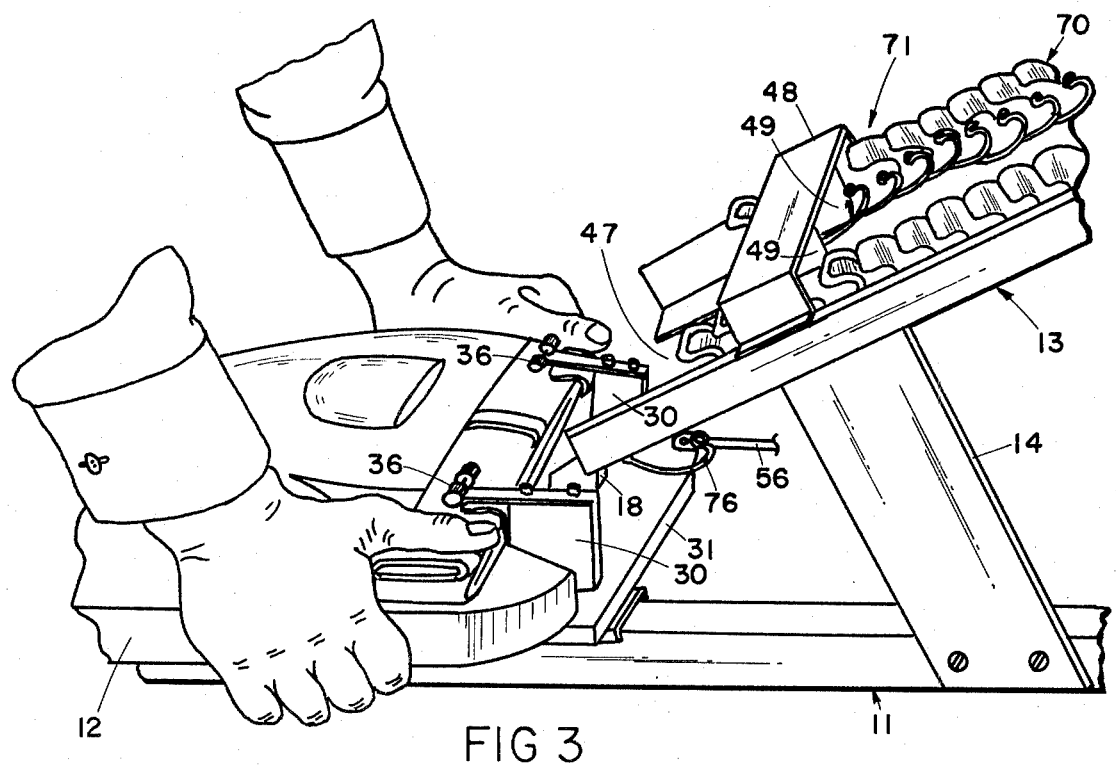
FIG. 3 is a view similar to FIG. 2 illustrating the invention when the machine has advanced to secure the hanger to the garment.
Figure 6:
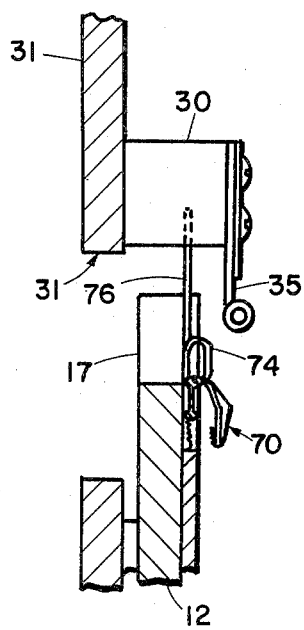
FIG. 6 is a fragmentary, sectional view of the hanger clamp closing mechanism in retracted position.
Figure 7:
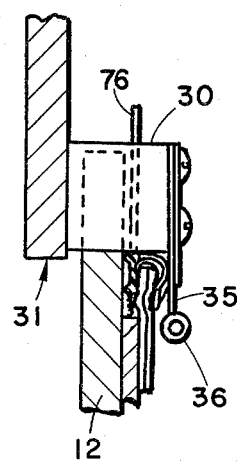
FIG. 7 is a view similar to FIG. 6 illustrating the mechanism in advanced, hanger clamp closing position.
Figure 11:
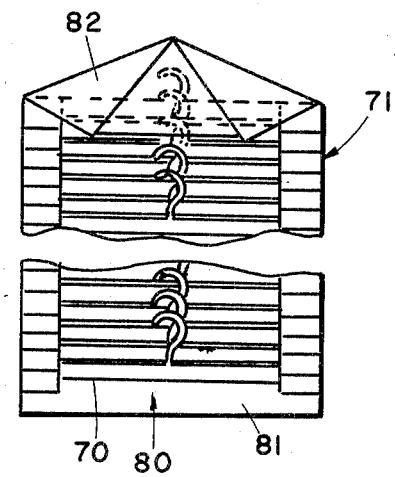
FIG. 11 is a bottom view of a stack or column of hangers with an attached sheet or web ready for packing for shipment.
Figure 12:
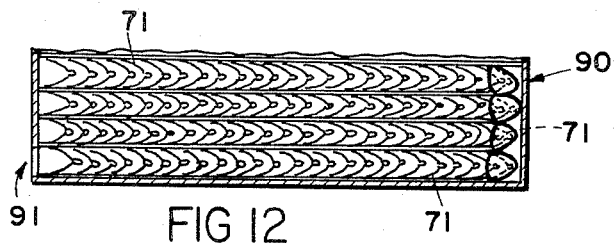
FIG. 12 is a fragmentary, side view of a shipping carton with the side face removed illustrating the manner in which the hangers are packed within the carton.
Figure 10:
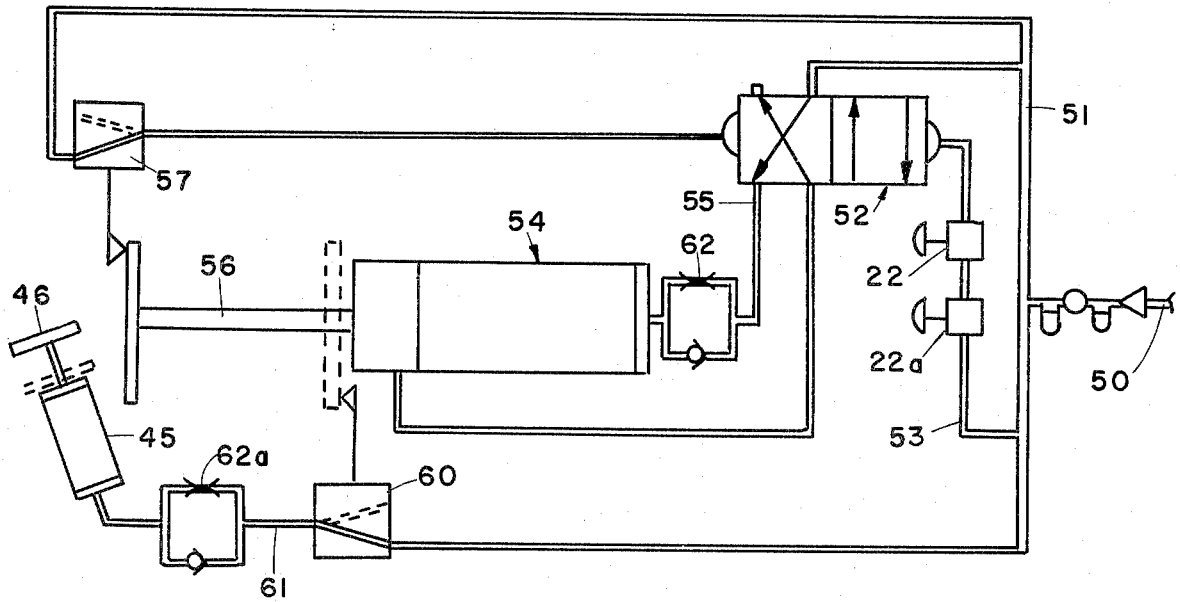
FIG. 10 is a schematic of the pneumatic system and controls for operating the machine.

Once the hanger is seated in the recesses 19 and 20 with the forward ends of the clamps seated against the ends of the recesses, the operator pushes a garment into the open clamps of the hanger. The front edge of the guides 18 prevent the operator from pushing the hanger rearwardly while inserting the garment. The operator then presses the valve buttons 22 and 22a. When he does this, once again the cylinder 54 advances the piston 56 forcing the closure elements 30 forwardly pushing the rollers 36 over the open jaws 72 of the hanger clamps, closing them. At the same time, as is clearly seen in FIG. 3, the clips 74 of the clamps are forced forwardly over the jaws of the clamps locking them in closed position. As the piston 56 reaches the position where the closure elements 30 are at maximum extended position, the switch 57 is tripped, reversing the piston and retracting the closure elements. As soon as this happens, the operator removes the hanger-garment combination and, as he does this, the retraction of the piston 56 triggers the reciprocal stop 46 to lift the next hanger over the top of the fixed stops 42 so it slides into position to receive the next garment. The guard 48 has a pair of depending fingers 49 (FIGS. 1, 2 and 3) which prevent the next hanger behind the one being ejected by the eject bar 46 from being pulled out of the column. The speed with which hangers can be applied to garments is limited only by the speed at which the operator can move the garments into position between the clamping jaws of the hangers and press the actuator valves 22 and 22a.

FIG. 13 illustrates a modified construction for the pocket of the web. In this case the web 81a is simply folded once at one end to form the pocket. The center portion of the folded portion is removed at 85 and the edges of the folded portion are glued or stapled down.

While a pair of control buttons 22 and 22a are shown, it will be recognized that various constructions could be sustituted including placing the controls on the sides of or beneath the platform. If desired, a single switch could be utilized.

It will also be recognized that the above described method of loading the hangers into the shipping carton could be substantially changed. Instead of placing the hangers as a column in the carton and then applying the web, it would be possible to place the carton upside down and load it through the bottom. In this case, the hangers would be resting on the web as loaded and the hangers lifted into the carton by grasping the web at opposite ends. After sufficient layers of hangers have been placed in the carton to fill it, the carton can be closed and then inverted for the purpose of removal of the hangers so that the last layer of hangers placed in the carton in the packaging process becomes the first layer of hangers to be withdrawn. It will also be recognized that while this invention has been described as specifically useful for the packaging clamp equipped skirt and slack hangers, the packaging concepts are more broadly applicable. For example, the stacking and tiering of the hangers using separating webs and the hook receiving pockets can be used with other types of hangers such as those for sweaters, shirts, vests and coats provided either the hangers or the web has means which prevents the hangers from being displaced lengthwise of the web when the web is pulled out of the carton.

It will be recognized that various modifications of this invention and of the method of packaging hangers as herein described can be made without departing from the principles of the invention. Such modifications shall be considered as included in the herinafter appended claims unless these claims by their language expressly state otherwise.

The embodiments of the invention in which an exclusive property or privilege is claimed are defined as follows:

1. A machine for securing hangers to garments, said hangers having an elongated bar-like body with a central supporting hook and terminating in a pair of garment gripping clamps one at each end, each clamp consisting of a pair of jaws hinged to each other and a U-shaped locking clip slidable over said jaws for holding them in closed garment gripping position, said machine having a stationary garment supporting platform, abutments on said platform for locating and holding a hanger with its jaws open to receive a garment; cantilevered arm means and a support element supporting said arm means for reciprocal movement between advanced and retracted positions; said arm means when moving to advanced position passing over said jaws to wipe them to closed position and pushing said locking clip into jaw locking position; fluid operated means for reciprocating said arm means; a magazine for hangers having a discharge end adjacent said abutments, a trigger at one side of said platform operatively connected to said fluid operated means for initiating its advance movement, said magazine having an elongated tray for receiving hangers telescoped over each other with the clips of each downstream hanger nested within the open jaws of the next upstream hanger, said tray being inclined downwardly toward said abutments at an angle inducing the hangers to slide downwardly thereof by gravity; said tray adjacent its discharge end having a pair of stops centered between the sides of the tray and spaced lengthwise thereof; the lower one of said stops being stationary and projecting above the surface of said tray; actuation means mounting the upper stop for reciprocal movement between an advanced position extending above the surface of the tray and restraining hangers against downward movement along said tray and a retracted position substantially flush with the surface of said tray, said upper stop when retracted being beneath the hanger seated against said lower stop, a sensing element responsive to the advance movement of said arm means, said upper stop when actuated by said sensing element advancing to kick the hanger bearing against said lower stop over said lower stop whereby it can advance to said platform; a guard positioned over said tray having a pair of fingers positioned over the hanger next upstream from the one positioned over said upper stop to hold the hanger against upward movement as the hanger on the upper stop is forcibly separated from it; means connected to said sensing element for maintaining said upper stop in extended position until said arm means is retracted to its initial position.

2. A machine for securing hangers to garments, said hangers having an elongated bar-like body with a central supporting hook and terminating in a pair of garment gripping clamps one at each end, each clamp consisting of a pair of jaws hinged to each other and a U-shaped locking clip slidable over said jaws for holding them in closed garment gripping position, said machine having attachment means to receive a hanger and to close the clamps thereof on a garment and a magazine for hangers having a discharge end adjacent said attachment means, said magazine having an elongated tray for receiving hangers telescoped over each other with the clips of each downstream hanger nested within the open jaws of the next upstream hanger, said tray being inclined downwardly toward said attachment means at an angle inducing the hangers to slide downwardly thereof by gravity; said tray adjacent its discharge end having a pair of stops centered between the sides of the tray and spaced lengthwise thereof; the lower one of said stops being stationary and projecting above the surface of said tray; actuation means mounting the upper stop for reciprocal movement between an advanced position extending above the surface of the tray and restraining hangers against downward sliding movement along said tray and a retracted position substantially flush with the surface of said tray, said upper stop when retracted being beneath the hanger seated against said lower step, a sensing element responsive to the actuation of said attachment means, said upper stop when actuated by said sensing element advancing to kick the hanger bearing against said lower stop over said lower stop whereby it can advance to said attachment means; a guard positioned over said tray having a pair of fingers positioned over the hanger next upstream from the one positioned over said upper stop to hold the hanger against upward movement as the hanger on the upper stop is forcibly separated from it; means connected to said sensing element for maintaining said upper stop in extended position until said attachment means returns to its initial position.

* * * * *

UNITED STATES PATENT AND TRADEMARK OFFICE
CERTIFICATE OF CORRECTION

PATENT NO. : 4,381,599

DATED : May 3, 1983

INVENTOR(S) : Everett Duester et al.

It is certified that error appears in the above-identified patent and that said Letters Patent is hereby corrected as shown below:

Column 1, line 35:

"meas" should be --means--

Column 2, lines 48 and 49:

Column 4, line 32:

"to" should be --so--

Column 8, line 13:

"step" should be --stop--

Signed and Sealed this

Twenty-sixth Day of June 1984

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,381,599
DATED : May 3, 1983
INVENTOR(S) : Everett Duester et al.

It is certified that error appears in the above-identified patent and that said Letters Patent is hereby corrected as shown below:

Column 1, line 35:

"meas" should be --means--

Column 4, line 32:

"to" should be --so--

Column 8, line 13:

"step" should be --stop--

This certificate supersedes certificate of correction issued June 26, 1984.

Signed and Sealed this

Twenty-second Day of October 1985

[SEAL]

Attest:

Attesting Officer

DONALD J. QUIGG

Commissioner of Patents and Trademarks—Designate